United States Patent

Steffensen et al.

[11] Patent Number: 5,528,667
[45] Date of Patent: Jun. 18, 1996

[54] TIME MANAGEMENT FOR CORDLESS TELEPHONE BY INPUTS FROM A USER THROUGH THE KEYPAD TO CAUSE DATA TO BE TRANSFERRED TO THE EXTERNAL SOURCE VIA INPUT TERMINALS AND MATING TERMINALS ON A BATTERY CHARGER

[75] Inventors: Jon Steffensen, Brønshøj; Thomas Jespersen, Farum, both of Denmark

[73] Assignee: U.S. Philips Corporation, New York, N.Y.

[21] Appl. No.: 391,377

[22] Filed: Feb. 17, 1995

Related U.S. Application Data

[63] Continuation of Ser. No. 124,118, Sep. 20, 1993, abandoned.

[30] Foreign Application Priority Data

Oct. 13, 1992 [GB] United Kingdom ............. 9221438

[51] Int. Cl.⁶ .................................................. H04Q 7/32
[52] U.S. Cl. .......................... 379/58; 379/59; 379/61; 455/111
[58] Field of Search ............................. 379/58, 59, 61; 455/11.1

[56] References Cited

U.S. PATENT DOCUMENTS

| | | | |
|---|---|---|---|
| 4,481,382 | 11/1984 | Villa Real | 379/61 |
| 4,872,005 | 10/1989 | DeLuca et al. | 340/825 |
| 4,979,205 | 12/1990 | Haraguchi et al. | 379/61 |
| 5,020,090 | 5/1991 | Morris | 379/58 |
| 5,128,981 | 7/1992 | Tsukamoto | 379/58 |
| 5,185,566 | 2/1993 | Goedker et al. | 320/48 |
| 5,249,218 | 9/1993 | Sainton | 379/59 |
| 5,249,302 | 9/1993 | Metroka | 455/11.1 |
| 5,428,668 | 6/1995 | Dert et al. | 379/59 |

FOREIGN PATENT DOCUMENTS

| | | | |
|---|---|---|---|
| 0434231 | 6/1991 | European Pat. Off. | |
| 4309116 | 9/1994 | Germany | 379/61 |
| 58-124362 | 7/1983 | Japan . | |
| 63-187951 | 8/1988 | Japan . | |
| 3166844 | 7/1991 | Japan . | |
| 6120881 | 4/1994 | Japan | 379/61 |
| 6224815 | 8/1994 | Japan | 379/61 |
| 9203007 | 2/1991 | WIPO . | |
| 9013213 | 11/1991 | WIPO . | |

*Primary Examiner*—Curtis Kuntz
*Assistant Examiner*—William Cumming
*Attorney, Agent, or Firm*—David R. Treacy

[57] ABSTRACT

A cordless telephone which includes a static RAM (50) for storing time management information and a real time clock (52). The time management information which includes telephone numbers and diary information is written into the static RAM (50) using a personal computer (PC) during recharging of the telephone's batteries. In operation, the telephone's microcontroller (40) compares the real time with entries stored in the static RAM (50) and when there is coincidence, an alert is given to the user. Alternatively data entered into the static RAM (50) by a user using a key pad (46) or derived from a received radio telephone link can be read-out to the PC when the batteries are being recharged.

6 Claims, 2 Drawing Sheets

TIME MANAGEMENT FOR CORDLESS TELEPHONE BY INPUTS FROM A USER THROUGH THE KEYPAD TO CAUSE DATA TO BE TRANSFERRED TO THE EXTERNAL SOURCE VIA INPUT TERMINALS AND MATING TERMINALS ON A BATTERY CHARGER

This is a continuation of application Ser. No. 08/124,118, filed Sep. 20, 1993 now abandoned.

BACKGROUND OF THE INVENTION

The present invention relates to a cordless telephone having the facility for time management, for example the ability to store and recall diary information. In the present specification, the term cordless telephone is meant to include a cellular telephone handset which communicates by way of a radio link with a public or private base station.

Japanese Patent Publication 58-124362 discloses a multi-function telephone set which is connected to an external line. The telephone set includes a clock circuit, a calendar circuit, a control circuit, a key pad, a display panel and an alarm circuit. By operation of a key on the key pad various functions such as time and date can be displayed arbitrarily. Also it is possible to set an alarm. The telephone set also includes a telephone circuit which is connected to the external line by actuation of the key on the key pad.

Japanese Patent Publication 63-187951 discloses a multifunctional telephone set with a calendar. The telephone set includes an electronic memory pad in which a user can store a telephone number and the time required for origination of the call using a key pad. When the required time coincides with the real time then a display panel displays the telephone number and the name of the party to be called and by actuation of an appropriate key on the key pad, a call is initiated to the telephone number stored.

Japanese Patent Publication 3-166844 discloses a cordless telephone device having a separate electronic notebook. The electronic notebook is used to store various telephone numbers as required by a user. The electronic notebook is provided with a light emitter. The cordless telephone includes a transceiver, key pad and other standard features together with a light receiver. By juxtaposing the light emitter and light receiver it is possible to transfer optically a telephone number which is read out from the electronic notebook and is written into an electronic memory in the cordless telephone in which it is used for direct dialling of the party to be called. There is no disclosure of the cordless telephone itself having the alerting function described in the two first mentioned telephone sets. Rather the alert functions are executed by the electronic notebook which is carried separately from the cordless telephone and then juxtaposed therewith to down load the telephone number by way of the optical link.

SUMMARY OF THE INVENTION

An object of the present invention is to facilitate time management in a cordless telephone.

According to a first aspect of the present invention there is provided a cordless telephone comprising a housing including a microcontroller having terminals coupled to transceiving means, a key pad, a display means, a real time clock and storage means for storing time management information, the microcontroller being responsive to the receipt of an interrogation signal for reading out an item or items of time management information.

According to a second aspect of the present invention there is provided a combination of a cordless telephone in accordance with a first aspect of the present invention, said cordless telephone having input terminals on the housing by which time management information in the storage means can be updated by an external source and a battery charging apparatus, the battery charging apparatus comprising a casing having a receptacle for receiving the cordless telephone and terminals in said receptacle for mating with the input terminals of the cordless telephone, when inserted into the receptacle, whereby time management information in the storage means can be updated. By means of the present invention a user can update the means for storing the time management information and change different user programmable options by the use of a personal computer connected to the cordless telephone.

The present invention will now be described, by way of example, with reference to the accompanying drawings.

FIG. 1 is a diagram of a first arrangement by which a time management memory in a cordless telephone is updated using a personal computer (PC) coupled to a PC interface built into the battery charger, FIG. 2 is a view similar to FIG. 1 but differs in that the PC interface is separate from the battery charger, FIG. 3 is a view similar to FIG. 1 but differs in that there is no PC interface but a buffer is provided in the battery charger, and FIG. 4 is a block schematic diagram of the cordless telephone. In the drawings the same reference numerals have been used to indicate corresponding features.

DESCRIPTION OF THE PREFERRED EMBODIMENT

Figure 1:
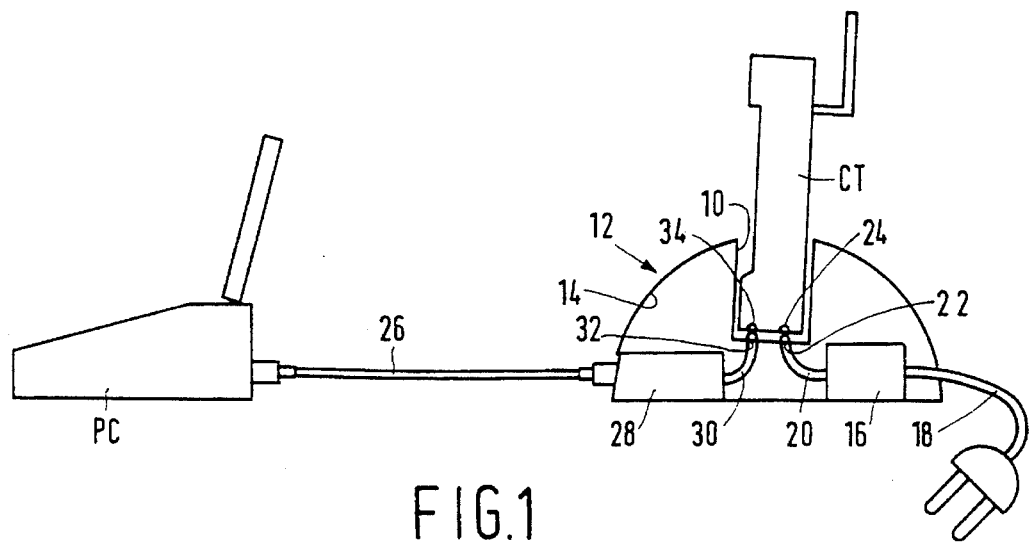

The arrangement shown in FIG. 1 comprises a cordless telephone CT located in a receptacle 10 in the casing 14 of a desk top battery charger 12. A battery charging unit 16 is incorporated into the casing 14. The unit 16 has a mains connector 18 and output conductors 20 connected to contacts 22 in the bottom of the receptacle, which contacts 22 mate with contacts 24 in the bottom of the cordless telephone CT when placed in the receptacle 10.

The cordless telephone CT includes means providing a time management function, said means being described later with reference to FIG. 4. Using a personal computer PC, updating of the time management function means is carried out when the cordless telephone CT is located in the receptacle 10 of the battery charger 12. Also any information stored in the cordless telephone by, or at the wish of, the user can be transferred to the PC. In FIG. 1 the PC is connected by an RS232 cable 26 to a PC interface 28 incorporated into the casing 14 of the battery charger 12. The PC interface is coupled by an I²C bus 30 to contacts 32 in the bottom of the receptacle 10. The cordless telephone CT is provided with data contacts 34 which mate with the contacts 32 for conductive receipt of signals when the cordless telephone CT is located in the receptacle.

The PC interface 28, which includes a microcontroller, carries out several tasks. It acts as a buffer between the PC and the cordless telephone CT. This is necessary to convert from the RS232 protocol to the I²C protocol and the other way. It acts as a voltage converter because signals carried by the different kinds of cables and busses connected to the PC interface 28 are at different levels. It can manipulate the data received on either the RS252 cable 26 or the I²C bus so that the data being transferred from the PC interface 28 to the other unit (either the PC or the cordless telephone) corresponds to the protocol used. Finally, in response to instructions from the PC, it can execute various other actions.

Figure 2:
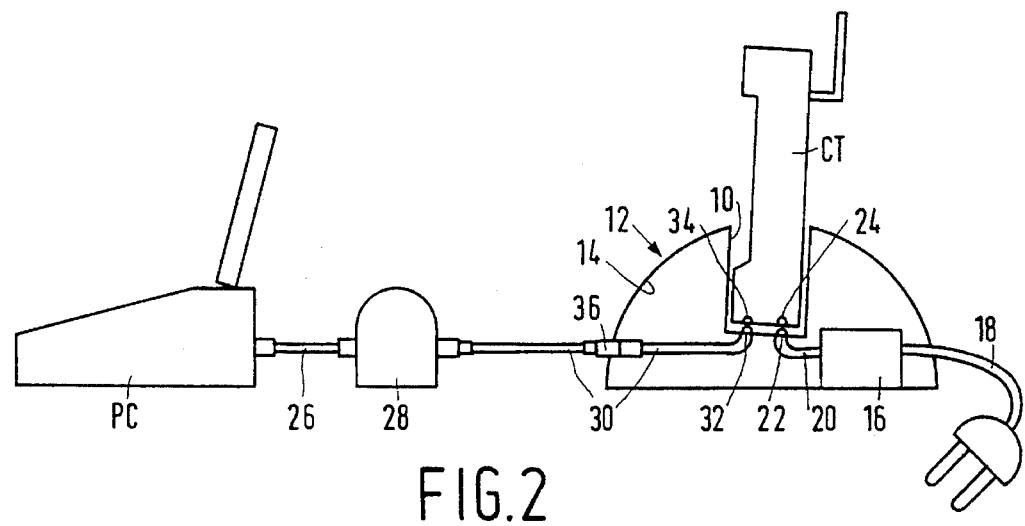
Figure 4:
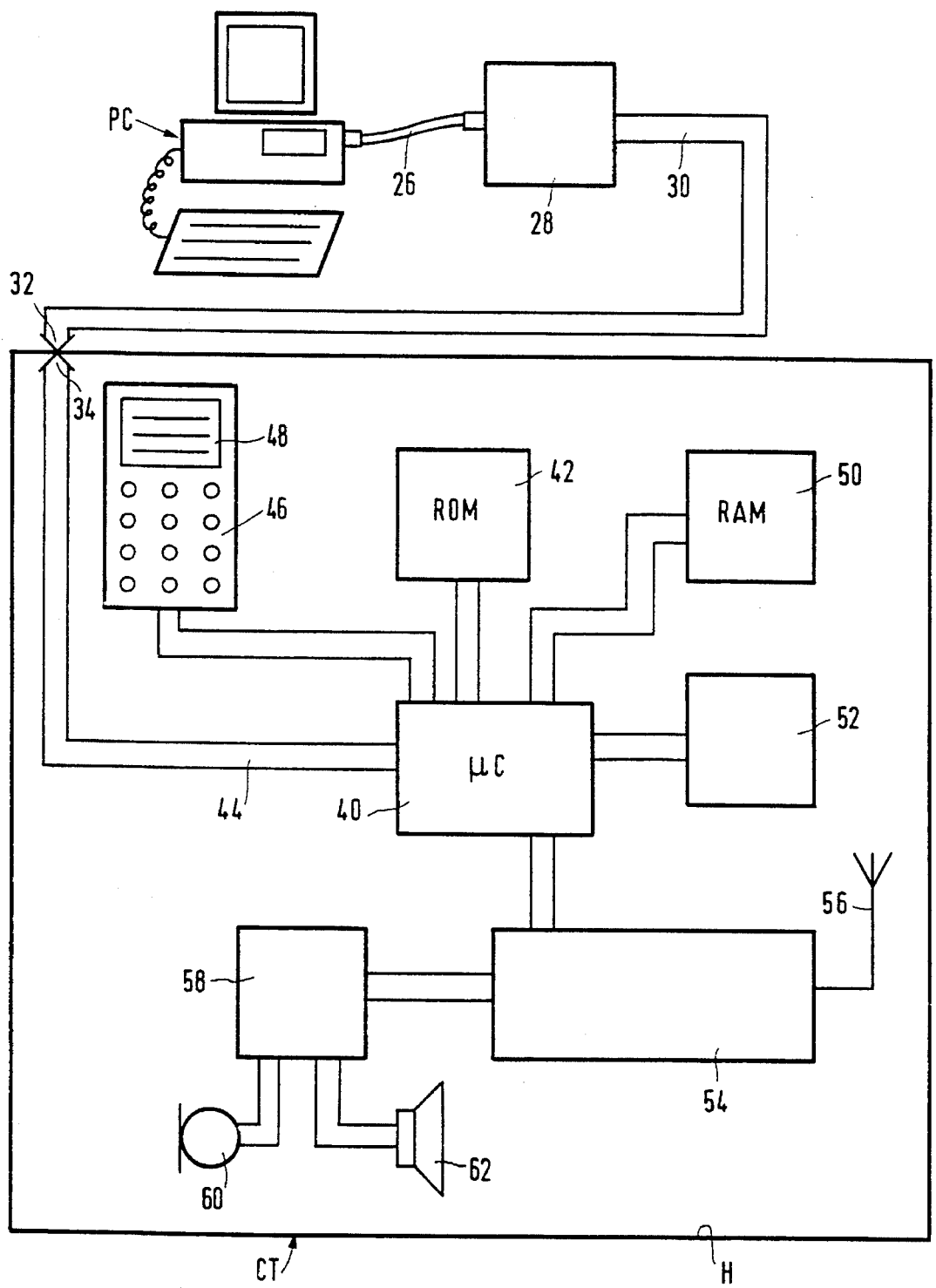

The specific PC interface 28 used in the arrangements shown in FIGS. 1, 2 and 4 permits the use of an I²C bus between the PC interface and the cordless telephone CT and the RS232 cable with software control between the PC interface 28 and the PC. By software control is meant that none of the possible hardware control signals are used. The protocol used between the PC interface 28 and the cordless telephone CT follows the specifications for the I²C bus and the protocol between the PC interface 28 and the PC is as follows:

When the PC interface 28 receives databytes from the cordless telephone CT, it will forward them to the PC as fast as it is possible. If the internal memory capacity of the PC interface 28 is full it will halt the transmission from the cordless telephone CT according to the I²C bus protocol.

FIG. 2 illustrates a variant of the arrangement shown in FIG. 1 in which the PC interface 28 is physically separate from the battery charger 12. The connection between the PC and the PC interface 28 is by way of the RS232 cable 26 and that between the PC interface 28 and the contacts 32 is by way of the I²C bus 30, if necessary using a plug and socket connection 36 on the casing 14 of the battery charger. Such an arrangement has the advantage that the battery charger 12 is of simpler and cheaper construction compared to that shown in FIG. 1.

Figure 3:
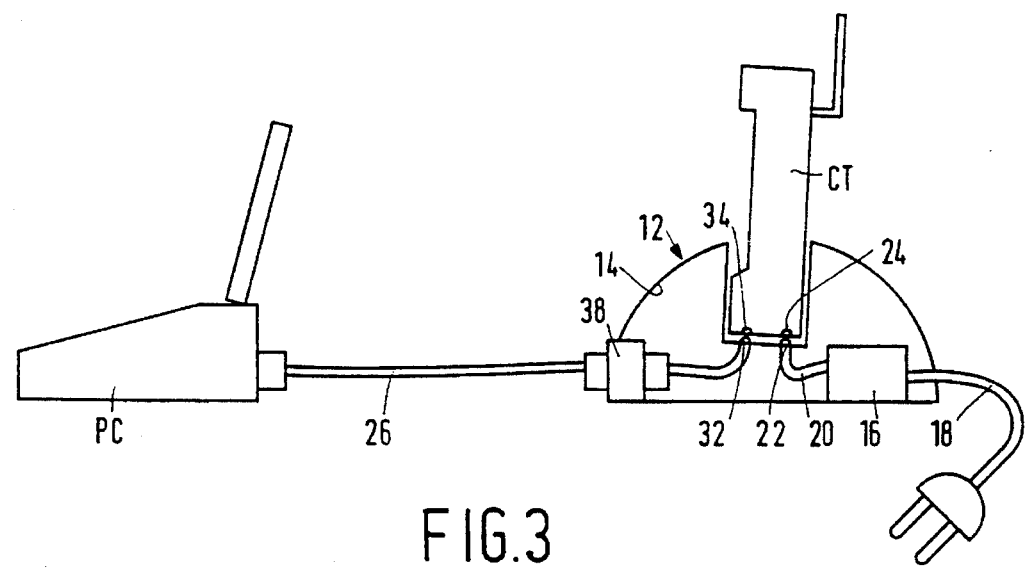

In the arrangement shown in FIG. 3, the PC interface has been omitted and the electrical connection from the PC to the contacts 32 is by way of the RS232 cable 26 and, optionally, a buffer 38 mounted in the casing 14 of the desk top battery charger 12. With such an arrangement, the cordless telephone CT has to be able to receive a databyte or an address byte in accordance with the protocol used on the RS232 cable.

Referring to FIG. 4, the cordless telephone CT comprises a housing H containing the various component parts of the portable handset. For convenience of description and illustration, only those features which are relevant to the understanding of the present invention will be referred to. Accordingly there will be no detailed description of processing a telephone call and operations such as call handover, error detection and correction, and battery monitoring and charging.

The cordless telephone CT comprises a main microcontroller 40 which has a plurality of inputs and outputs. The contacts 34 are connected by an I²C bus 44 to the microcontroller 40.

The following items are connected to the microcontroller: a key pad 46, an LCD panel (including drivers) 48, a static random access memory (RAM) 50 for storing time management information, a real time clock 52 and an rf module 54. The rf module 54 is connected to an antenna 56 and to an audio section 58 which has connections to a microphone 60 and a loudspeaker 62.

In operation, irrespective of whether or not the cordless telephone is in the battery charger, a user can send and receive calls in the usual way. Also the microcontroller 40 automatically compares the time read out of the real time clock 52 with timed entries in the static RAM 50. When there is coincidence then the microcontroller 40 sends an alert to the user by way of an indication on the LCD panel 48 and/or an audio alert. Optionally a user can check what entries there are in the static RAM 50 by keying-in appropriate codes.

Normally the batteries in the cordless telephone CT will be recharged daily and when doing so the PC and PC interface can be coupled to the battery charger 12 and the static RAM 50 updated. Sometimes the user has stored data in the static RAM 50 by means of the key pad 46 or by means of a received data signal and wants to transfer it to the PC. Such an operation can be done during the charging of the batteries.

Optionally if an entry in the static RAM 50 relates to the user telephoning a particular number then the microcontroller 40 is able to feed the number to a dialler (not shown) which causes the number to be transmitted by way of the r.f. module 54. However not all cellular or cordless telephone systems, for example the Nordic Mobile Telephone (NMT) system, permit such automatic dialling.

When implementing the present invention, the transfer of data between the PC and the cordless telephone CT can make use of any suitable coding and protocol, examples of which can be found in relevant textbooks.

From reading the present disclosure, other modifications will be apparent to persons skilled in the art. Such modifications may involve other features which are already known in the design, manufacture and use of cordless telephones and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A combination of a cordless telephone and a battery charging apparatus, wherein said cordless telephone has a housing, and comprises within said housing a rechargeable battery, a microcontroller, a transceiving means, a keypad, display means, a real time clock and storage means for storing time management data; and said cordless telephone has battery charging terminals in said housing, and said battery charging apparatus has a casing having means for receiving the cordless telephone, and charger terminals for mating with said battery charging terminals when the cordless telephone is received by said means for receiving, characterized in that the cordless telephone further comprises at least one input terminal on said housing adjacent to, but spaced from, said battery charging terminals, and means for transferring data in at least one direction between the storage means and said at least one input terminal, said battery charging apparatus comprises at least one signal terminal disposed adjacent to, but spaced from, the charger terminals for mating with said at least one input terminal when the cordless telephone is received by said means for receiving, and means for connecting said at least one signal terminal to an external source to permit transfer of data in at least one direction between the storage means in the telephone and the external source while the battery is being charged, and said microcontroller is operable, in response to inputs from a user through the keypad, to cause data in the storage means to be transferred to the external source via the at least one input terminal and the at least one signal terminal while the battery is being charged.

2. A combination as claimed in claim 1, characterized in that said means for connecting includes a data cable connection, and a buffer connected between the at least one signal terminal and the data cable connection.

3. A combination as in claim 1, characterized in that said microcontroller is operable, in response to signals from the external source, to cause time management data, received by the connecting means from the external source and transferred via the at least one signal terminal and the at least one input terminal, to be stored in the storage means while the battery is being charged.

4. A combination of a cordless telephone and a battery charging apparatus, wherein said cordless telephone has a housing, and comprises within said housing a rechargeable battery, a microcontroller, a transceiving means, a keypad, display means, a real time clock and storage means for storing time management data; and said cordless telephone has battery charging terminals on said housing, and said battery charging apparatus has a casing having means for receiving the cordless telephone, and charger terminals for mating with said battery charging terminals when the cordless telephone is received by said means for receiving, characterized in that the cordless telephone further comprises input terminals on said housing disposed adjacent to, but space from said battery charging terminals for conductively receiving signals from an external source to update the time management data stored in said storage means, said battery charging apparatus comprises signal terminals disposed adjacent to, but spaced from, said charger terminals for conductively mating with said input terminals when the cordless telephone is received by said means for receiving, a personal computer interface, and means for connecting said signal terminals to an external personal computer via the personal computer interface to permit transfer of time management data in at least one direction between the storage means in the telephone and the external personal computer while the battery is being charged, and said microcontroller is operable, in response to inputs from a user through the keypad, to cause data in the storage mean to be transferred to the external personal computer via the input terminals and the signal terminals while the battery is being charged.

5. A combination as claimed in claim 4, characterized in that said microcontroller is operable, in response to signals from the external personal computer, to cause time management data, received by the connecting means from the external personal computer and transferred via the signal terminals and the input terminals, to be stored in the storage means while the battery is being charged.

6. A cordless telephone having a housing, and comprising within said housing a microcontroller, a transceiving means, a keypad, display means, a real time clock, storage means for storing time management data, and a rechargeable battery; and battery charging terminals on the housing for conductively mating with terminals in a battery charging apparatus, characterized by further comprising input terminals on said housing, adjacent to but spaced from said battery charging terminals, for conductively receiving signals from an external source through mating terminals on the battery charging apparatus, to update the time management data stored in said storage means while the battery is being charged, and said microcontroller is operable, in response to inputs from a user through the keypad, to cause data in the storage means to be transferred to the external source via the input terminals and the mating terminals on the battery charging apparatus while the battery is being charged.

* * * * *